(12) United States Patent
Vazquez et al.

(10) Patent No.: US 10,084,775 B1
(45) Date of Patent: *Sep. 25, 2018

(54) TIME-VARYING REPRESENTATIONS OF USER CREDENTIALS

(71) Applicant: MicroStrategy Incorporated, Vienna, VA (US)

(72) Inventors: Hector Vazquez, Ashburn, VA (US); Gang Chen, Vienna, VA (US); Sergey Mironenko, Ellicott City, MD (US)

(73) Assignee: MicroStrategy Incorporated, Vienna, VA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/582,892

(22) Filed: May 1, 2017

Related U.S. Application Data

(63) Continuation of application No. 13/957,020, filed on Aug. 1, 2013, now Pat. No. 9,640,001.

(60) Provisional application No. 61/731,897, filed on Nov. 30, 2012.

(51) Int. Cl.
| | |
|---|---|
| *G05B 19/00* | (2006.01) |
| *H04L 29/06* | (2006.01) |
| *H04W 12/06* | (2009.01) |
| *H04W 12/08* | (2009.01) |
| *H04L 9/14* | (2006.01) |
| *H04L 9/30* | (2006.01) |

(52) U.S. Cl.
CPC ........ *H04L 63/0846* (2013.01); *H04L 63/068* (2013.01); *H04L 63/107* (2013.01); *H04W 12/06* (2013.01); *H04W 12/08* (2013.01); *H04L 9/14* (2013.01); *H04L 9/30* (2013.01)

(58) Field of Classification Search
None
See application file for complete search history.

(56) References Cited

U.S. PATENT DOCUMENTS

| | | |
|---|---|---|
| 5,668,874 A | 9/1997 | Kristol |
| 5,918,228 A | 6/1999 | Rich et al. |
| 6,023,769 A | 2/2000 | Gonzalez |
| 6,477,645 B1 | 11/2002 | Drews |
| 6,668,322 B1 | 12/2003 | Wood et al. |
| 6,715,082 B1 | 3/2004 | Chang et al. |
| 6,754,823 B1 | 6/2004 | Kurzweil et al. |
| 6,993,658 B1 | 1/2006 | Engberg et al. |
| 7,216,109 B1 | 5/2007 | Donner |
| 7,225,464 B2 | 5/2007 | Satyavolu et al. |
| 7,266,693 B1 | 9/2007 | Potter et al. |
| 7,356,837 B2 | 4/2008 | Asghari-Kamrani et al. |
| 7,379,393 B2 | 5/2008 | Morykwas et al. |
| 7,454,349 B2 | 11/2008 | Teunen et al. |
| 7,475,812 B1 | 1/2009 | Novozhenets et al. |

(Continued)

OTHER PUBLICATIONS

Fazackerley, Mark, "The Usher Identity Platform: A description of Micro Strategy's mobile identity solution," Usher by Microstrategy, Apr. 2014, 15 pages, URL<https://www.slideshare.net/markfazackerley3/usher-functionality>.

(Continued)

*Primary Examiner* — Brian Zimmerman
*Assistant Examiner* — Renee Dorsey
(74) *Attorney, Agent, or Firm* — Fish & Richardson P.C.

(57) ABSTRACT

Obtaining and/or validating time-varying representations for user credentials at client devices is described.

21 Claims, 8 Drawing Sheets

(56) References Cited

U.S. PATENT DOCUMENTS

| | | | |
|---|---|---|---|
| 7,512,254 | B2 | 3/2009 | Vollkommer et al. |
| 7,694,130 | B1 | 4/2010 | Martinez |
| 7,814,538 | B2 | 10/2010 | Kuehnel et al. |
| 7,882,549 | B2 | 2/2011 | Edwards, Jr. et al. |
| 8,087,072 | B2 | 12/2011 | Gajjala et al. |
| 8,117,459 | B2 | 2/2012 | Cameron et al. |
| 8,181,236 | B2 | 5/2012 | Banerjee |
| 8,234,220 | B2 | 7/2012 | Weiss |
| 8,234,494 | B1 | 7/2012 | Bansal et al. |
| 8,255,971 | B1 | 8/2012 | Webb et al. |
| 8,295,855 | B2 | 10/2012 | Narayan et al. |
| 8,613,052 | B2 | 12/2013 | Weiss |
| 8,739,260 | B1 | 5/2014 | Damm-Goossens |
| 8,752,145 | B1 | 6/2014 | Dotan et al. |
| 8,775,807 | B1 | 7/2014 | Vazquez et al. |
| 9,027,099 | B1 | 5/2015 | Saylor et al. |
| 9,154,303 | B1 | 10/2015 | Saylor |
| 9,264,415 | B1 | 2/2016 | Saylor et al. |
| 9,269,358 | B1 | 2/2016 | Saylor et al. |
| 9,450,758 | B1 * | 9/2016 | Allen ............ H04L 9/3202 |
| 2002/0026593 | A1 | 2/2002 | Sakuma et al. |
| 2002/0078243 | A1 | 6/2002 | Rich et al. |
| 2002/0141586 | A1 | 10/2002 | Margalit et al. |
| 2004/0003260 | A1 | 1/2004 | Hawkes et al. |
| 2004/0054898 | A1 | 3/2004 | Chao et al. |
| 2004/0153649 | A1 | 8/2004 | Rhoads et al. |
| 2004/0234131 | A1 | 11/2004 | Kondo |
| 2005/0033837 | A1 | 2/2005 | Bohannon |
| 2005/0165667 | A1 | 7/2005 | Cox |
| 2005/0166263 | A1 | 7/2005 | Nanopoulos et al. |
| 2005/0238208 | A1 | 10/2005 | Sim |
| 2007/0050635 | A1 | 3/2007 | Popp |
| 2007/0061730 | A1 | 3/2007 | Kuenzi |
| 2007/0277224 | A1 | 11/2007 | Osborn et al. |
| 2008/0071537 | A1 | 3/2008 | Tamir et al. |
| 2008/0163361 | A1 | 7/2008 | Davis |
| 2008/0178271 | A1 | 7/2008 | Gajjala |
| 2008/0256594 | A1 | 10/2008 | Satish |
| 2009/0097661 | A1 | 4/2009 | Orsini |
| 2009/0117883 | A1 | 5/2009 | Coffing et al. |
| 2009/0119757 | A1 | 5/2009 | Acuna |
| 2009/0187975 | A1 | 7/2009 | Edwards, Jr. |
| 2009/0239503 | A1 | 9/2009 | Smeets |
| 2009/0292641 | A1 | 11/2009 | Weiss |
| 2010/0031051 | A1 | 2/2010 | Machani |
| 2010/0082491 | A1 | 4/2010 | Rosenblatt et al. |
| 2010/0098256 | A1 | 4/2010 | Kirshenbaum |
| 2010/0116880 | A1 | 5/2010 | Stollman |
| 2010/0169958 | A1 | 7/2010 | Wener et al. |
| 2010/0269156 | A1 | 10/2010 | Hohlfeld |
| 2011/0270751 | A1 | 11/2011 | Csinger et al. |
| 2011/0321144 | A1 | 12/2011 | Saxena |
| 2012/0028609 | A1 | 2/2012 | Hruska |
| 2012/0144203 | A1 | 6/2012 | Albisu |
| 2012/0191575 | A1 | 7/2012 | Vilke |
| 2012/0253809 | A1 | 10/2012 | Thomas et al. |
| 2012/0257759 | A1 | 10/2012 | Nick et al. |
| 2012/0274444 | A1 | 11/2012 | Micali |
| 2012/0291108 | A1 | 11/2012 | Talamo |
| 2013/0037607 | A1 | 2/2013 | Bullwinkel |
| 2013/0061301 | A1 | 3/2013 | Novak |
| 2013/0073463 | A1 * | 3/2013 | Dimmick ............ G06Q 20/40 705/44 |
| 2013/0074168 | A1 | 3/2013 | Hao |
| 2013/0111056 | A1 | 5/2013 | Prasad |
| 2013/0111571 | A1 | 5/2013 | Jakobsson |
| 2013/0112760 | A1 | 5/2013 | Schory et al. |
| 2013/0124292 | A1 | 5/2013 | Juthani |
| 2013/0124855 | A1 | 5/2013 | Varadarajan |
| 2013/0125231 | A1 | 5/2013 | Kuenzi |
| 2013/0132091 | A1 | 5/2013 | Skerpac |
| 2013/0139233 | A1 | 5/2013 | Malty |
| 2013/0173915 | A1 | 7/2013 | Haulund |
| 2013/0198264 | A1 | 8/2013 | Hellman et al. |
| 2013/0205360 | A1 | 8/2013 | Novak et al. |
| 2013/0222835 | A1 | 8/2013 | Iwamoto et al. |
| 2013/0227710 | A1 | 8/2013 | Barak |
| 2013/0263211 | A1 | 10/2013 | Neuman et al. |
| 2013/0276075 | A1 | 10/2013 | Gong |
| 2013/0282588 | A1 | 10/2013 | Hruska |
| 2013/0325704 | A1 | 12/2013 | Gorman et al. |
| 2014/0001253 | A1 | 1/2014 | Smith |
| 2014/0040139 | A1 | 2/2014 | Brudnicki |
| 2014/0245417 | A1 | 8/2014 | Hu |
| 2014/0281525 | A1 | 9/2014 | Acar et al. |

OTHER PUBLICATIONS

Cahill et al., "Micro Strategy Introduces Enterprise Security Platform Usher, Debuts Usher Software Development Kit," MicroStrategy, Apr. 2015, 4 pages, URL<http://ir.microstrategy.com/releasedetail.cfm?releaseid=904735>.

"Introduction to Usher," Usher by MicroStrategy, May 2014, 10 pages, URL<https://mobileapps.microstrategy.com/usher/MSTREmployeeFAQ/MSTREmployeeFAQ.html>.

"MicroStrategy Usher: the revolutionary new security solution," MicroStrategy, 2015, 20 pages, URL<https://www.microstrategy.com/Strategy/media/downloads/Resource%20Center/security/Whitepaper-UsherSecurityArch.pdf>.

Lee, Justin, "Inside Micro Strategy's biometric mobile identity platform Usher," Biometrics Research Group, Inc., Apr. 2, 2015, 5 pages, URL<http://www.biometricupdate.com/201504/inside-microstrategys-biometric-mobile-identity-platform-usher>.

"Transport Operators and Barcode M-Ticketing: Expand station sales capacity without spending more on staff and ticket machines," Masabi, London, UK, publicly available before Jun. 10, 2013, 2 pages.

Essa et al., M.I.T Media Laboratory Perceptual Computing Section Technical Report No. 370 Appears: Proceedings of Computer Animation '96 Conference, Geneva, Switzerland, Jun. 1996, pp. 1-12.

Jain et al. "An Introduction to Biometric Recognition," IEEE Transactions on Circuits and Systems for Video Technology vol. 14, No. 1, Jan. 2004, pp. 4-20.

Lei, "Similarity Between the Mandelbrot Set and Julia Sets," Commun. Math. Phys. 134, 587-617, 1990.

McBryan, "Textual Associations from Images Applied to Authentication," Masters Thesis 2005/2006, pp. 1-106.

Mills, "The Autokey Security Architecture, Protocol and Algorithms," Technical Report 06-1-1, Jan. 2006, 61 pages.

Open Intents—(O1 Countdown, Feb. 5, 2011, 3 pages).

Oprea et al., "Securing a Remote Terminal Application with a Mobile Trusted Device," ACSAC'04, 2004, 10 pages.

Rail Industry Meetings [online]. "Masabi and MBTA to launch first smartphone rail ticketing system in the US," Mar. 2012, [Retrieved on Jun. 14, 2012]. Retrieved from the Internet: <URL: http://www.abe-industry.com/railim/index.php/en/newsflash/788-masabi-and-mbta-to-launch-first-smartphone-rail-ticketing-system-in-the-us.html>. 2 pages.

Ray, "Apple Passbook card-'n'-ticket app paves way for iOS e-wallet," The Register, Jun. 12, 2012, [Retrieved on Jun. 14, 2012]. Retrieved from the Internet: <URL: http://www.theregister.co.uk/2012/06/12/apple_passbook/>. 3 pages.

Rooney "Masabi Launches U.S.'s First Ticketless Rail System," The Wall Street Journal, Apr. 2012, [Retrieved on Jun. 14, 2012]. Retrieved from the Internet: <URL: http://blogs.wsj.com/tech-europe/2012/04/23/masabi-launches-u-s-s-first-ticketless-rail-system/>. 3 pages.

Saragih et al., "Realtime avatar animation from a single image." Automatic Face & Gesture Recognition and Workshops (FG 2011), 2011 IEEE International Conference on. IEEE, 2011, pp. 117-124.

Weir et al., "Testing Metrics for Password Creation Policies by Attacking Large Sets of Revealed Passwords," CCS'10, Oct. 4-8, 2010, pp. 162-175.

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

(56) References Cited

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.
Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.
Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.
Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.
Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.
Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.
Wikipedia, "Public key certificate," Wikipedia [online] Aug 12, 2012 [retrieved on Aug. 15, 2012]. Retrieved from the Internet: <URL: http://en.wikipedia.org/wiki/Digital_certificates>, 7 pages.
Wikipedia, "Public-key cryptography," Wikipedia [online] Aug 15, 2012 [retrieved on Aug. 15, 2012]. Retrieved from the Internet: <URL: http://en.wikipedia.org/wiki/Public-key_cryptography>, 12 pages.
Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.
Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.
Wikipedia, "Two-factor authentication," Wikipedia [online] Aug. 13, 2012 [retrieved on May 15, 2012]. Retrieved from the Internet <URL: http://en.wikipedia.org/wiki/Two-factor_authentication>, 15 pages.
U.S. Final Office Action for U.S. Appl. No. 13/914,296 dated Feb. 5, 2015, 15 pages.
U.S. Final Office Action for U.S. Appl. No. 13/914,403 dated Feb. 26, 2015, 13 pages.
U.S. Final Office Action for U.S. Appl. No. 13/914,408 dated Mar. 9, 2015, 23 pages.
U.S. Final Office Action for U.S. Appl. No. 13/914,429 dated Jan. 14, 2015, 15 pages.
U.S. Non-Final Office Action for U.S. Appl. No. 13/874,721, dated Nov. 4, 2014, 13 pages.
U.S. Non-Final Office Action for U.S. Appl. No. 13/914,296 dated Oct. 22, 2014, 18 pages.
U.S. Non-Final Office Action for U.S. Appl. No. 13/914,373 dated Apr. 6, 2015, 18 pages.
U.S. Non-Final Office Action for U.S. Appl. No. 13/914,403 dated Nov. 7, 2014, 12 pages.
U.S. Non-Final Office Action for U.S. Appl. No. 13/914,408 dated Nov. 13, 2014, 22 pages.
U.S. Non-Final Office Action for U.S. Appl. No. 13/914,429 dated Sep. 11, 2014, 16 pages.
U.S. Notice of Allowance in U.S. Appl. No. 13/914,353 dated Dec. 8, 2014, 19 pages.
U.S. Notice of Allowance in U.S. Appl. No. 13/914,353 dated Mar. 27, 2015, 9 pages.
U.S. Non-Final Office Action for U.S. Appl. No. 13/914,296 dated Jun. 17, 2015, 29 pages.
U.S. Non-Final Office Action for U.S. Appl. No. 13/914,408 dated Jun. 17, 2015, 22 pages.
U.S. Non-Final Office Action for U.S. Appl. No. 13/914,403 dated Jun. 2, 2015, 16 pages.
U.S. Notice of Allowance in U.S. Appl. No. 13/874,721 dated Jun. 4, 2015, 14 pages.
U.S. Notice of Allowance in U.S. Appl. No. 13/914,403 dated Oct. 8, 2015, 12 pages.
U.S. Notice of Allowance in U.S. Appl. No. 13/914,373 dated Oct. 16, 2015, 31 pages.
U.S. Non-Final Office Action for U.S. Appl. No. 13/957,020 dated Mar. 11, 2016, 12 pages.
U.S. Non-Final Office Action for U.S. Appl. No. 15/040,777 dated Apr. 13, 2016, 20 pages.
U.S. Non-Final Office Action for U.S. Appl. No. 15/043,202 dated Apr. 13, 2016, 20 pages.
U.S. Final Office Action for U.S. Appl. No. 15/043,202, dated Jul. 26, 2016, 24 pages.

\* cited by examiner

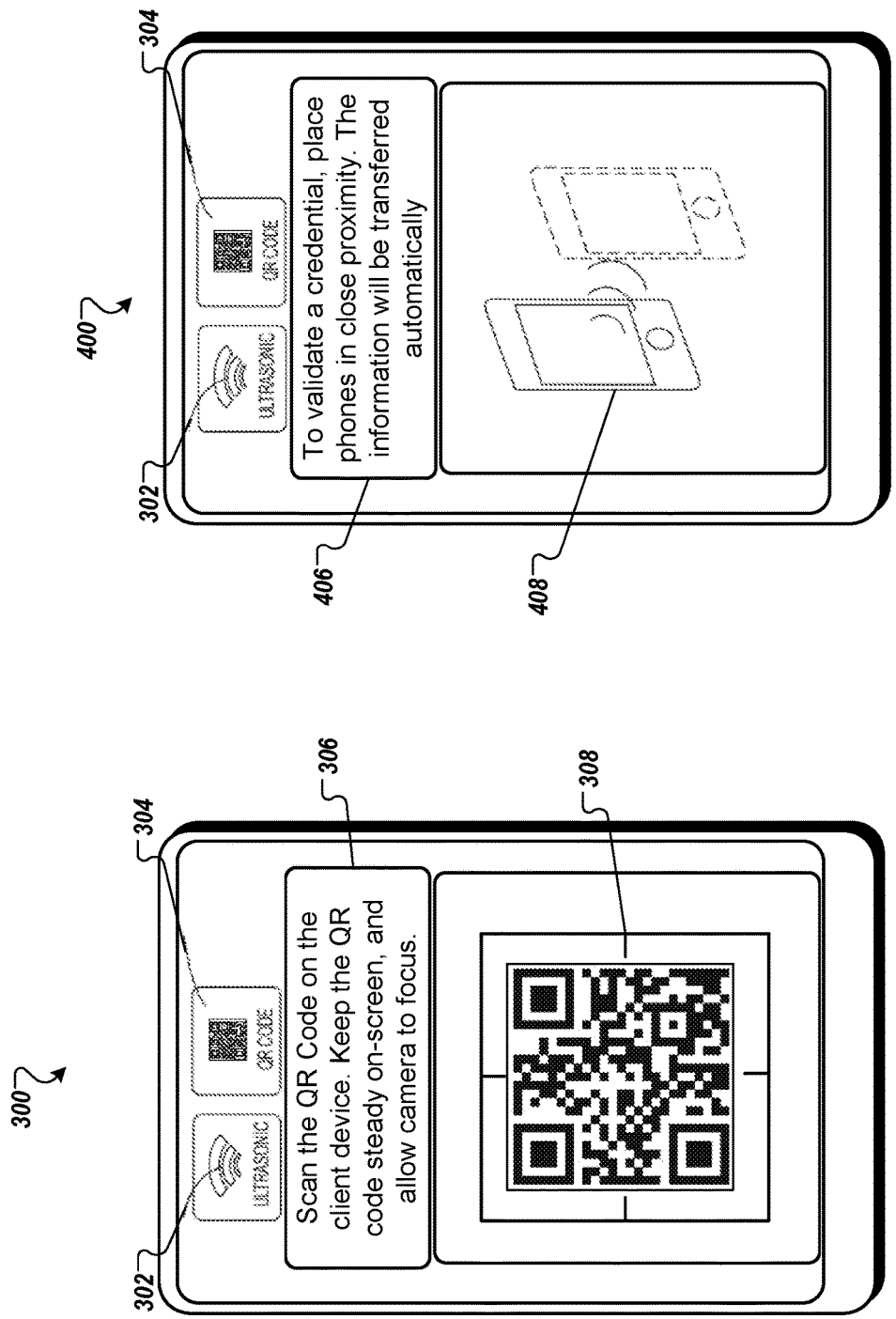

TIME-VARYING REPRESENTATIONS OF USER CREDENTIALS

CROSS-REFERENCE TO RELATED APPLICATION

This application is a continuation (and claims the benefit of priority under 35 USC 120) of U.S. application Ser. No. 13/957,020, filed Aug. 1, 2013, now allowed, which claims the benefit of claims priority from U.S. Provisional Application No. 61/731,897, filed Nov. 30, 2012, and titled "Time-Varying Representations of User Credentials," which is incorporated herein by reference in its entirety.

TECHNICAL FIELD

This specification generally relates to user credentials.

BACKGROUND

In certain instances, a person may be associated with a credential that, for example, permits the person to access events and/or locations.

SUMMARY

In general, one aspect of the subject matter described in this specification may include the actions of receiving a validation request from a processing system associated with a validation entity, the validation request comprising a set of alphanumeric characters, wherein the set of alphanumeric characters were derived from a time-varying representation for a credential, the set of alphanumeric characters comprising data corresponding to a key associated with a user, a credential identifier identifying the credential, and a first time at a client device. The actions also include determining that the key is associated with the credential identifier and obtaining, at the server, a second time from a timing device. Then, the actions include determining that the second time from the timing device is within a predetermined amount of time of the first time at the client device. Responsive to determining that the key is associated with the credential identifier and that the second time is within a predetermined amount of time of the first time, the actions include communicating to the processing system a validation response indicating that the credential is validated.

Some implementations involve receiving the validation request via SMS from the processing system associated with the validation entity. In some implementations, the server is co-located with the processing system associated with the validation entity.

In some implementations, responsive to determining that the key is associated with the credential identifier and that the second time from the timing device is within the predetermined amount of time of the first time at the client device, the actions include obtaining an image of the user and transmitting, to a processing system, the image of the user.

Some implementations involve querying a database using the credential identifier to obtain a record corresponding to the credential identifier and determining that the record includes the key.

In some implementations, the time-varying representation for the credential is a time-varying optical machine-readable representation. In some implementations, the time-varying representation for the credential is a time-varying code rendered as a sound signal, the sound signal having a frequency greater than 20 kHz.

Some implementations involve determining that the first time at the client device does not match the second time from the timing device. The actions further include adjusting the second time from the timing device by an offset and determining that the adjusted second time matches the first time at the client device.

In general, another aspect of the subject matter described in this specification may include the actions of obtaining a time-varying representation for a credential from a client device of a user and decoding the time-varying representation for the credential to generate a set of alphanumeric characters, the set of alphanumeric characters comprising data corresponding to: (i) a key, (ii) a credential identifier, and (iii) a time at the client device, wherein the key is associated with the user, and wherein the credential identifier identifies the credential. The actions also include transmitting a validation request to a server, wherein the validation request includes data corresponding to the key, the credential identifier, and the time. Then, the actions include receiving a validation response from the server, the validation response indicating that the credential is validated.

In some implementations, the time-varying representation for the credential is a time-varying optical machine-readable representation. In some implementations, the time-varying representation for the credential is a time-varying code rendered as a sound signal, the sound signal having a frequency greater than 20 kHz.

In some implementations, responsive to receiving the validation response from the server, the actions include obtaining an image of the user and outputting the image of the user.

In general, yet another aspect of the subject matter described in this specification may include the actions of obtaining a key associated with a user of the client device and obtaining a credential identifier associated with a credential. The actions further include, in response to receiving a user command to output the representation for the credential, performing several actions. In particular, the actions include obtaining a time, generating a set of alphanumeric characters based on the credential identifier, the key, and the time, encoding the set of alphanumeric characters to generate a representation for the credential. Finally, the actions include outputting the representation for the credential in a manner that enables a validation entity to validate the credential.

Some implementations involve encoding the set of alphanumeric characters to generate an optical-machine readable representation for the credential, receiving a user command to display the optical-machine-readable representation for the credential, and outputting the optical machine-readable representation for the credential in a manner that enables a validation entity to validate the credential.

Some implementations involve encoding the set of alphanumeric characters into a sound signal representing the set of alphanumeric characters, receiving a user command to render the sound signal representing the credential from a speaker operatively coupled to the client device, and rendering, at a speaker operatively coupled to the client device, the sound signal representing the credential.

Some implementations involve hashing the credential identifier, the key, and the time. Some implementations involve obtaining a time derived from a timing device of the client device.

In general, yet another aspect of the subject matter described in this specification may include the actions of receiving a validation request from a processing system associated with a validation entity, the validation request comprising a first set of alphanumeric characters, wherein the first set of alphanumeric characters were derived from a time-varying representation for the credential, the first set of alphanumeric characters comprising data corresponding to a key identifying a first user, a credential identifier identifying a credential, and a first time at a client device. The actions further include determining that the key is associated with the credential identifier and obtaining a second time from a timing device. The actions then include generating a second set of alphanumeric characters comprising data corresponding to the key, the credential identifier, and the second time from the timing device and determining that the second set of alphanumeric characters matches the first set of alphanumeric characters. Finally, responsive to determining that the key is associated with the credential identifier, and that the second set of alphanumeric characters matches the first set of alphanumeric characters, the actions include communicating to the processing system a validation response indicating that the credential is validated.

In some implementations, the actions further include generating a candidate set of alphanumeric characters comprising data corresponding to the key, the credential identifier, and the second time from the timing device, determining that the candidate set of alphanumeric characters does not match the first set of alphanumeric characters, and adjusting the second time from the timing device by an offset. In such implementations, generating a second set of alphanumeric characters comprising data corresponding to the key, the credential identifier, and the second time from the timing device comprises generating, at the server, a second set of alphanumeric characters comprising data corresponding to the key, the credential identifier, and the adjusted second time from the timing device.

Other features may include corresponding systems, apparatus, and computer programs, configured to perform the actions of the methods, encoded on computer storage devices.

The details of one or more implementations are set forth in the accompanying drawings and the description, below. Other potential features and advantages of the disclosure will be apparent from the description and drawings, and from the claims.

DESCRIPTION OF DRAWINGS

FIG. 3 is a screenshot of an example of an application on a processing system operated by a validation entity for certain implementations that involve an optical machine-readable representation for a credential.

FIG. 4 is a screenshot of an example of an application on a processing system operated by a validation entity for certain implementations that involve a sound signal encoding a representation for a credential.

DETAILED DESCRIPTION

In some instances, it can be beneficial to generate representations of credentials for groups of users or for individuals. For additional security, it may be advantageous for such representations to vary over time (e.g., to mitigate replay attacks where a valid representation for a credential is maliciously or fraudulently repeated or delayed). As discussed herein, a time-varying representation for a credential may be a representation having a value, attribute, component, appearance and/or characteristic that changes as a function of time.

Credentials can be, for example, forms of personal identification (e.g., drivers' licenses, identity cards, passports, etc.), badges to gain entrance to a location, credentials to identify membership in a group (e.g., a graduate of a school or a professional certification, an employee of a business), tickets for entry to an event, redeemable vouchers, access badges that unlock locks and/or disable security systems such as alarms (e.g., for entry to a location), credentials for gaining access to information technology (IT) resources (e.g., credentials for logging into a computing device, network, or other computing resource, credentials for accessing an electronic file, directory, or other storage component, etc.), credentials for accessing an electronic account (e.g., credentials for accessing a bank account from a personal computing device and/or an automated teller machine (ATM)), etc. Credentials can be represented in various forms as described in detail below. For example, credentials can be represented by optical machine-readable representations and/or sound signals encoding alphanumeric codes that represent the credential. In certain aspects, credentials also may be hierarchical. For example, a first credential may generally identify an individual as an employee of Company X, while a second credential identifies the individual more specifically as an executive of Company X, and a third credential identifies the individual as the Chief Executive Officer of Company X.

Credentials can be managed by a server or collection of servers, and distributed to appropriate users' client devices. Time-varying representations for these credentials can then be outputted for evaluation by a validation entity, who confirms that the credential possessed by a given user is valid at a given time. A validation entity may be a person and/or a device that validates a credential.

Systems that generate, distribute, and validate time-varying representations for credentials are described below. First, a general description of example implementations will be described. Then, more detailed implementations are described.

Figure 1:
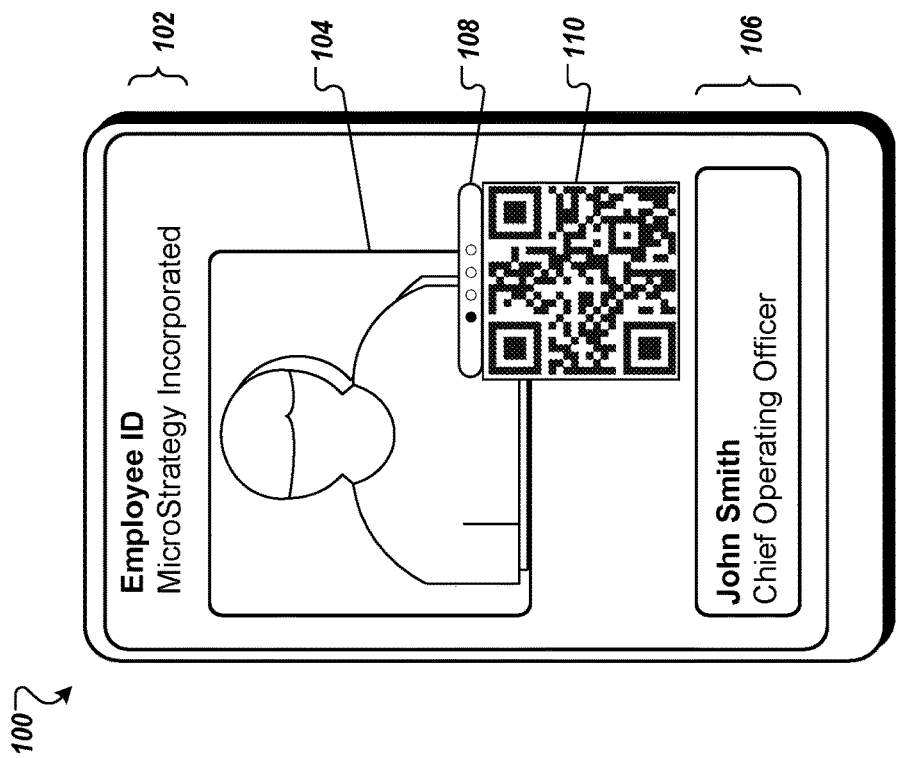
FIG. 1 is a screenshot of an example of an application on a client device for certain implementations that involve an optical machine-readable representation for a credential.

FIGS. 1 to 5 show sample screenshots of a scenario in which a user presents a time-varying representation for a credential to a validation entity, and the validation entity validates the representation. FIG. 1 shows a screenshot 100 of an example mobile application on a client device for certain implementations that involve an optical machine-readable representation for a credential. In particular, the screenshot 100 shows a representation for a credential that could be presented by the client device of an employee to obtain access to a location associated with an employer (e.g., an office building). The screenshot 100 includes a caption 102 indicating that the representation is an "Employee ID" for "MicroStrategy Inc." Also, the screenshot 100 also includes an image of the employee 104, and the name and title of the employee ("John Smith, Chief Operating Officer") in a caption 106.

Figure 2:
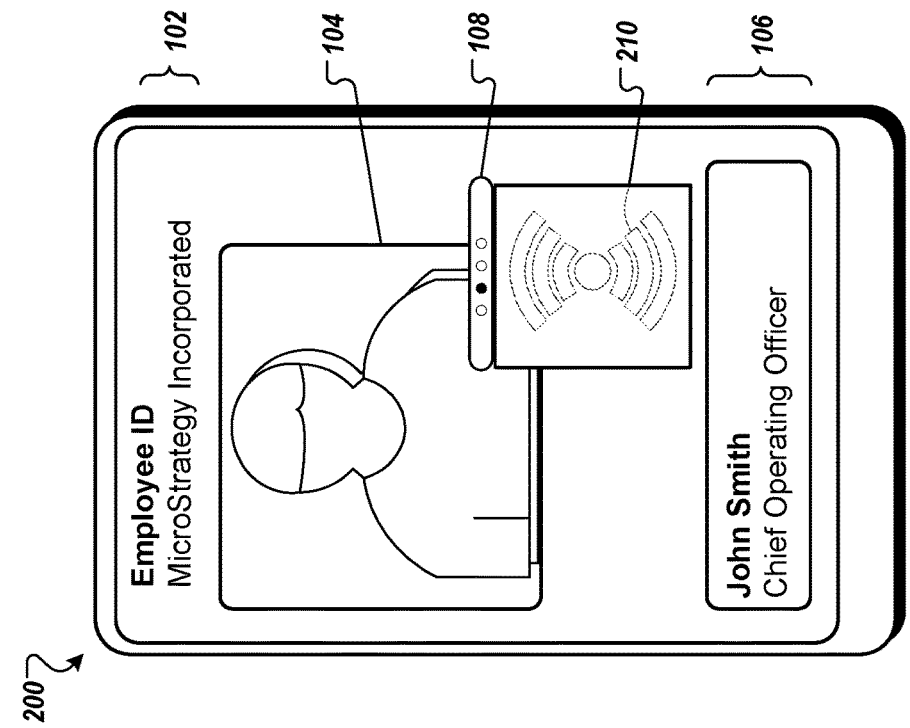
FIG. 2 is a screenshot of an example application on a client device for certain implementations that involve a sound signal encoding a representation for a credential.

The mobile application on the client device may be configured to enable a user to select between, for example, different representations for the credential by inputting a gesture, e.g., swiping slider 108 shown in FIGS. 1 and 2. The first position of the slider 108 may cause the application to display an optical machine-readable representation 110 of the credential as shown in FIG. 1 (e.g., a quick response (QR) code or bar code). As described below, the optical machine-readable representation generated at the client device varies over time. The second position of the slider 108 may cause the mobile application to output a sound signal from a speaker of the client device, where the sound signal encodes a code (e.g., an alphanumeric code) representing the credential. As described below, the code representing the credential generated at the client device also varies over time. In some implementations, the mobile application may provide a graphical indication 210 as shown in FIG. 2 that the sound signal is being outputted.

Based on the position of the slider 108 in FIG. 1, the screenshot 100 includes an optical machine-readable representation for a credential 110. As described below, a validation entity may operate a processing system to capture and decode the optical machine-readable representation 108, for example by scanning the display of the client device (e.g., taking a photograph of the display of the client device) and decoding the optical machine-readable representation for the credential 110. The validation entity can then validate the representation for the credential by communicating with a server.

FIG. 2 shows a screenshot 200 of an example mobile application on a client device for certain implementations that involve a sound signal encoding a representation for a credential. As described below, the sound signal encoding the representation for the credential varies over time. The screenshot 200 includes the captions 102, 106, image of the user 104, and slider 108 described above. Based on the position of the slider 108 in FIG. 2, the screenshot 200 includes a graphical indication 210 that a sound signal representing a credential is being outputted by the client device. As described below, a validation entity may operate a processing system to receive and decode the sound signal, for example by receiving the sound signal at a microphone of the processing system. The validation entity can then validate the representation for the credential by communicating with a server.

FIG. 3 shows a screenshot 300 of an example application on a processing system operated by a validation entity for certain implementations that involve an optical machine-readable representation for a credential. In particular, the screenshot 300 shows a user interface that enables a validation entity to validate a representation for a credential presented by an employee to obtain access to a location associated with an employer. The validation entity could be, for example, a security guard or receptionist at the entrance to a building.

The user interface for the validation entity may enable a validation entity to select between, for example, different modes to validate different representations for credentials by inputting a gesture, e.g., selecting command buttons 302, 304 shown in FIGS. 3 and 4. The command button 304 may cause the processing system to display a reticle 308 for scanning an optical machine-readable representation as shown in FIG. 3. The command button 302 may cause the processing system to receive a sound signal from a microphone of the processing system, where the sound signal encodes an alphanumeric code representing the credential. The processing system may provide a graphical indication 408 as shown in FIG. 4 that the sound signal is being received.

Based on the selection of command button 304, the screenshot 300 of FIG. 3 includes components that allow a validation entity to validate an optical machine-readable representation for a credential. In particular, the screenshot 300 includes a caption 306 instructing the validation entity to "Scan the QR code on the client device. Keep the QR code steady on-screen, and allow the camera to focus." In an example operation, the validation entity orients a camera coupled to the processing system such that an optical machine-readable representation for a credential (e.g., a QR code) displayed on a client device is within a reticle 308 displayed on the processing system. The processing system scans and decodes the QR code to obtain a set of alphanumeric characters. The processing system then requests validation of the credential by communicating the set of alphanumeric characters to a server.

FIG. 4 shows a screenshot 400 of an example of an application on a processing system operated by a validation entity for certain implementations that involve a sound signal encoding a representation for a credential. The screenshot 400 includes the command buttons 302, 304 described above. Based on the selection of command button 302, the screenshot 400 includes components that allow a validation entity to validate a sound signal outputted by a client device, where the sound signal encodes a representation for a credential. In particular, the screenshot 400 includes a caption 406 instructing the validation entity as follows: "To validate a credential, place phones in close proximity. The information will be transferred automatically." In an example operation, the validation entity places a microphone coupled to the processing system such that a sound signal being output by a speaker of a client device can be received. The processing system displays a graphical indication 408 that the processing system is ready to receive the sound signal. The processing system receives and decodes the code encoded within the sound signal to obtain a set of alphanumeric characters. The processing system then requests validation of the credential by communicating the set of alphanumeric characters to a server.

Figure 5:
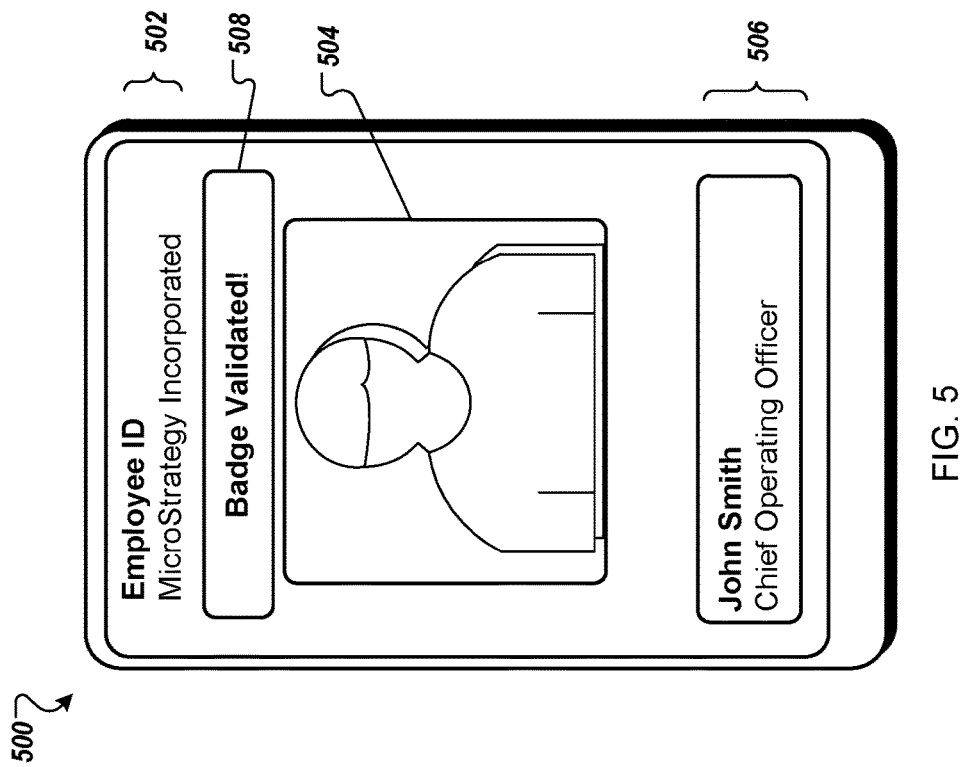
FIG. 5 is a screenshot of an example of an application on a processing system operated by a validation entity upon successful validation of a credential presented by a client device.

FIG. 5 shows a screenshot 500 of an example of an application on a processing system operated by a validation entity upon successful validation of a credential presented by a client device. After the processing system submits a validation request to the server, the server may send a validation response indicating that the credential has been validated. The processing system may then show information identifying the user associated with the validated credential as shown in screenshot 500. As an example, the screenshot 500 includes a caption 502 indicating that the credential was validated as an "Employee ID" for "MicroStrategy Inc." Also, the screenshot 500 also includes an image of the validated employee 504, and the name and title of the validated employee ("John Smith, Chief Operating Officer") in a caption 506. In some implementations, the validation entity may perform additional validation by visually comparing the user presenting the representation for the credential on the client device with the image 504 displayed at the processing system. The screenshot 500 also includes a message 508 to the user ("Badge Validated!") indicating that the credential was successfully validated.

Figure 6:
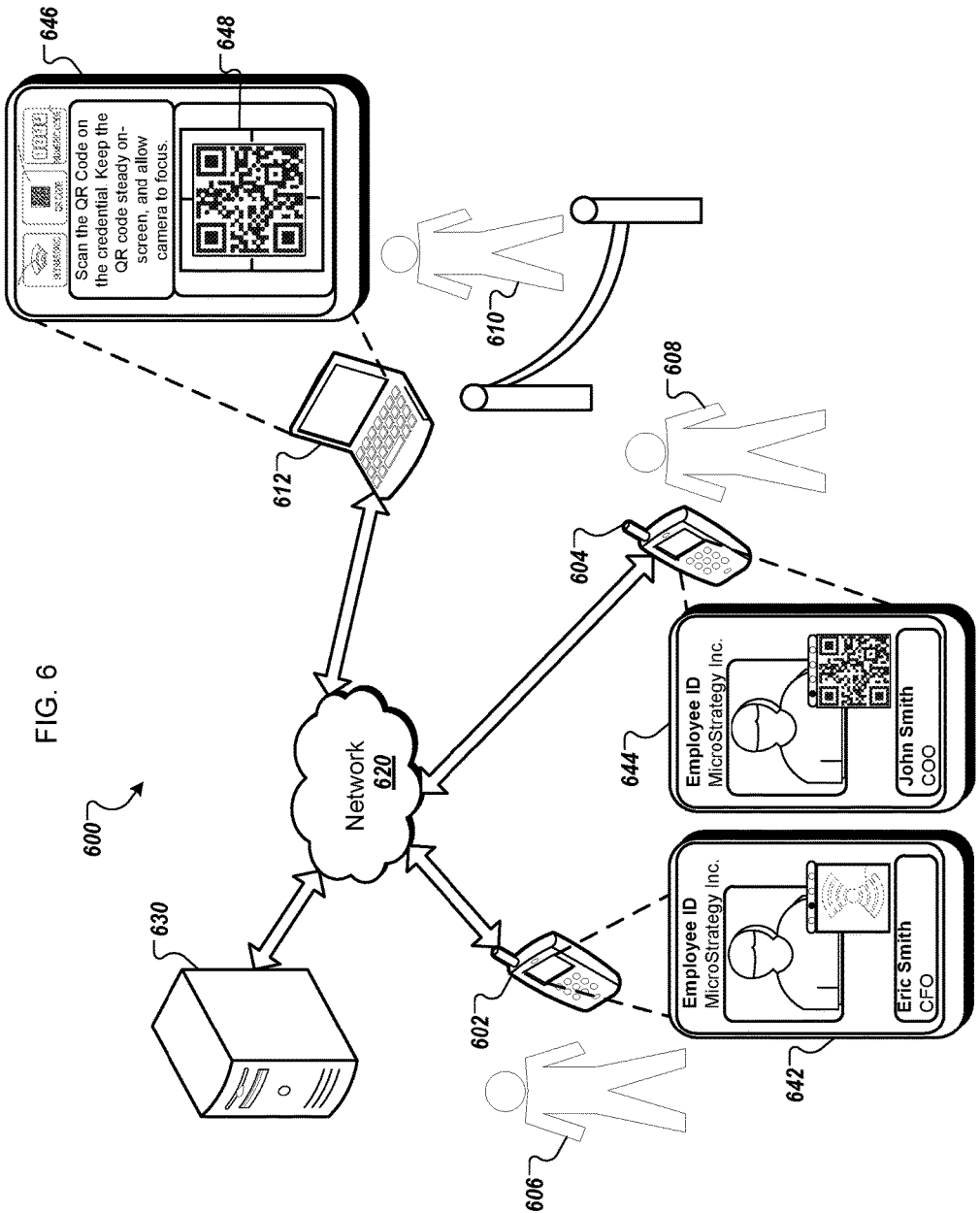
FIG. 6 is a diagram of an example system that manages time-varying representations for credentials, and permits a validation entity to validate the credentials.

FIG. 6 shows an example system 600 that manages time-varying representations for credentials associated with users and groups of users, and permits a validation entity to validate the credentials for each user. As an overview, a server 630 communicates via a network 620 with client devices 602, 604 operated by users 606, 608. The server 630 also communicates via network 620 with a processing system 612 operated by a validation entity 610. The validation entity 610 operates the processing system 612 to validate time-varying representations of credentials presented by the users 606, 608 on their client devices 602, 604 by communicating with the server 630 as described below.

In operation, the server 630 manages and/or stores one or more credentials, associates users and groups of users with appropriate credentials, and provides the credentials to users' client devices and/or processing systems (e.g., operated by credential authorities) for validation. The server 630 can be any suitable computer or collection of computers executing software capable of managing, distributing, and/or validating representations of credentials for users and groups of users via a network 620 as described herein.

Credentials, user accounts, group accounts, and administrative accounts can be stored in a database (e.g., MySQL, PostgreSQL, MS SQL Server, MongoDB), or other suitable data structure that can be accessed by the server 630. In some implementations, the server 630 may access the stored credentials and/or user accounts via web services such as representational state transfer (REST) style services.

As an initial step, the server 630 creates a credential based on input provided by a credential grantor (e.g., an employer). The credential may include a variety of information such as a credential identifier (e.g., a number or alphanumeric character string that uniquely identifies a credential), a description of an event or location, and/or one or more designated validation entities. The server 630 may present a suitable interface to the credential grantor for creation of credentials. For example, the server 630 may present a web interface through which grantors can interact via a Web browser. In other aspects, the server 630 may be directly accessible via a graphical-user interface or an application running on a mobile device. Any suitable interface can be used that enables the creation and storage of credentials, and user accounts. In addition (or as an alternative) to creation of credentials by credential grantors, credentials could be created at the request of registered users through a web-based or other interface, or through any other suitable mechanism such as sending email or short message service (SMS) transmissions to grantors. In some implementations, registered users may be able to create credentials by use of an application running on a client device.

The server 630 also may present an interface so that users and/or credential grantors can create user accounts for individual users and groups of users. For example, the server 630 may present a web interface through which credential grantors can interact via a Web browser. Additionally or alternatively, the server 630 may be directly accessible via a graphical-user interface or an application on a mobile device. User accounts may be stored in a table or collection of tables in a database, or in any other suitable data structure accessible by the server 630. The user accounts may include a variety of information such as user name, user identifier (e.g., a number or character string that uniquely identifies a user), one or more unique keys for the user (e.g., alphanumeric codes that can be used for encryption and/or decryption), the address(es) of one or more client devices owned by or otherwise associated with the user. Likewise, group accounts may be stored in a table, collection of tables, or other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups could be created at the request of potential users through a web-based or other interface, or through any other suitable means such as sending email or SMS to grantors. In some implementations, the potential users may be able to create user accounts by use of an application running on a client device.

As an example, Mr. John Smith may request a new user account from the server 630 using an application executing on his client device. The server 630 can then create database entries representing a user account for Mr. Smith. A credential grantor could then create a row in another table for a group identified as employees of Company X. The grantor and/or server 630 could then link the database entry for Mr. Smith to the group account for Company X through use of a linking table.

Once credentials and users, or groups of users, have been created, credential grantors and/or users can associate the credentials with users, or groups of users. For example, the server 630 may present a web interface through which grantors can interact via a Web browser to link a given credential to a given user or group of users. In other aspects, the server 630 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 630 also may notify the users that they have been associated with the credential(s), for example by pushing notifications to the respective users' client devices. Such notifications may include the credential identifier and/or a key for the user.

In addition or as an alternative to receiving push notifications from the server 630, the client devices may obtain the credential identifier and/or the key in various other ways. For example, the client devices may request the credential identifier and/or the key from the server 630. As described herein, a key may be any suitable alphanumeric code that is unique to a given user. For example, a key may be a symmetric key or shared secret between the client device and the server that can be used to maintain a private information link. In other implementations, the key may be a private key and/or public key that can be used with a public-key cryptographic system. The key may be of any suitable length such as, for example, 80 bits, 128 bits, or 256 bits. In some implementations, an application executing on the client device may have the key pre-installed, or may receive a key when a user first runs the application and creates a user account associated with the application, or may receive a key when a user logs into the application from the client device. In some implementations, the client device may receive the key from the server in a key exchange (e.g., a Diffie-Hellman key exchange).

Once credentials have been associated with appropriate user and/or group accounts, the credential identifiers and/or keys can then be distributed to client devices for the appropriate users via the network 620. For example, the network 620 may be a local area network ("LAN") and a wide area network ("WAN"), e.g., the Internet. In some versions, the server 630 may communicate with the client devices via SMS or multimedia messaging service (MMS). The server 630 may access user accounts in a database to locate the appropriate users' client devices.

Client devices 602, 604 can receive the credential identifiers and/or the keys associated with their respective users and store them in any suitable memory for later retrieval. Software applications executing on the client devices 602, 604 can then retrieve the credential identifiers and keys so they can be used for generating and presenting a representation of the credential to a validation entity for validation. The client devices 602, 604 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

FIG. 6 illustrates an example in which the credential corresponds to an employee badge for gaining entry into a place of business. Users 606 ("Eric Smith"), 608 ("John Smith") are employees and, consequently, have received credential identifiers associated with the credential. The validation entity 610 is a security guard responsible for permitting only authorized individuals to enter the place of business. As described in greater detail below, the credential for accessing the place of business may be represented in a variety of different formats, and the validation entity 610 may be able to validate representations of the credential in any of these different formats.

The client device 602 of user 606 is executing an application that displays a user interface 642 (similar to the screenshot 200 shown in FIG. 2) indicating that the client device 602 is outputting a sound signal representing the credential. The client device 604 of user 608 is executing an application that displays a user interface 644 including an optical machine readable representation for the credential (e.g., a quick response (QR) code) similar to the screenshot 100 shown in FIG. 1. User 608, at the front of the entry line, has presented the QR code for validation to the validation entity 610.

Moreover, the client device 602, 604 may obtain the user's image from, for example, a memory of the client device 602, 604, or a server such as a server associated with the credential grantor. The client device 602, 604 may display this image before, after, and/or during presentation of the optical machine-readable representation for authentication of the user 606, 608.

When a user 606, 608 decides to present a time-varying representation of a credential to the validation entity 610 for validation, the user 606, 608 may input a command into the user's client device 602, 604 via a man-machine interface (e.g., a user interface on a presence-sensitive display). An application executing on the client device 602, 604 then generates and outputs the selected time-varying representation. In particular, when the users 606, 608 enter a command to cause the client devices 602, 604 to output an optical machine-readable representation for a credential, the client devices 602, 604 generate a set of alphanumeric characters that then are encoded as an optical machine-readable representation. Similarly, when the users 606, 608 enter a command to cause the client devices 602, 604 to output a sound signal representing a credential, the client devices 602, 604 generate a set of alphanumeric characters that then are encoded as the sound signal. The set of alphanumeric characters may include, for example, letters, numbers, a combination of letters and numbers, and/or any other symbols (e.g., "!" or "@"). In some implementations, the set of alphanumeric characters generated for encoding as an optical machine-readable representation for a credential may be the same as the set of alphanumeric characters generated for encoding as a sound signal. In other implementations, the set of alphanumeric characters generated for encoding as an optical machine-readable representation for a credential may be different than the set of alphanumeric characters generated for encoding as a sound signal.

The client devices 602, 604 can generate the set of alphanumeric characters using a time, a key associated with the user, and a credential identifier. The client devices 602, 604 may obtain a time derived from a timing device of the client device. The time can be, for example, a current timestamp (e.g., seconds or milliseconds from epoch) obtained from a timing device such as a hardware or software clock located at the client device. In some implementations, the timing device can be synchronized with the server 630, and/or with one or more additional servers that provide a master clock reference as described below. The credential identifier and the key can be provisioned onto the client device as described elsewhere herein.

The mapping of the key, time, and credential identifier to the set of alphanumeric characters can use any suitable technique. For example, the credential identifier, key, and time could be concatenated, manipulated using mathematical functions, encrypted using a cryptographic algorithm such as AES, hashed using a hash function such as MD5, SHA-1 or SHA-2, subsampled to select a predetermined subset or subsets, or any combination of these techniques to generate a suitable set of characters. In some implementations, the set of alphanumeric characters may include a random number or a nonce (e.g., a one-time use code) to provide additional security. The client devices 602, 604 and/or server 630 may check that this random number has not been used for a validation request within a predetermined number of prior requests (e.g., the last 10, 20, or 30 requests). For example, the client devices 602, 604 and/or server 630 could store the previously used random numbers in a database and confirm that a new validation request does not include one of the previously used random numbers. Any other suitable data could also be included in the set of alphanumeric characters, such as, for example, a checksum, a user identifier, a code identifying a type of credential (e.g., whether the credential is for access to a physical resource (e.g., a location) or a logical resource (e.g., a network and/or computing resource), and/or an index identifying a particular device of a user on which the representation of the credential is rendered.

As an example, the client devices 602, 604 may generate a set of alphanumeric characters (e.g., a "Code") by concatenating several strings as follows:

Code=Credential_ID: Truncate (MD5 (Checksum), Last_10): Random(0-9999);

where "Credential_ID" is the credential identifier for the credential being represented, "Truncate( . . . , Last_10)" is a truncation function that returns the last 10 characters of the input string, "MD5( . . . )" is a function that performs an MD5 hash function on the input "Checksum" string, "Random(0-9999)" is a function that returns a random number between 0 and 9,999, and "Checksum" is a checksum derived from the credential identifier, the key, and the time; and Checksum=Credential_ID: Key: Floor(time/300);

where "Credential_ID" is the credential identifier, "Key" is a key associated with the user 606, 608, and "Floor(time/300)" is a function that returns the current time in seconds at the client device 602, 604 divided by 300 and rounded down.

As another example, the client devices 602, 604 may generate a set of alphanumeric characters (e.g., a "Code") by concatenating several strings as follows:

Code=Payload: Checksum;

Payload=Credential_Type: Credential_ID: Device_Index: Random (0-9999);

where "Credential_Type" identifies the type of credential, "Credential_ID" is the credential identifier for the credential being represented, "Device_Index" identifies a device of a particular user 606, 608 on which the representation of the credential is to be rendered (e.g., the device index may be useful for tracking which device was used to display the representation of the credential that was validated if a user has multiple devices that can be used to present the representation for the credential), "Random(0-9999)" is a function that returns a random number between 0 and 9999, and "Checksum" is a checksum derived from the Payload, the key, and the time; and Checksum=Truncate (MD5 (Payload: Key: Floor(time/300)), Last_8);

where "Truncate( . . . , Last_8)" is a truncation function that returns the last 8 characters of the input string, "MD5( . . . )" is a function that performs an MD5 hash function on the input string, "Key" is a key associated with the user 606, 608, and "Floor(time/300)" is a function that returns the current time in seconds at the client device 602, 604 divided by 300 and rounded down.

As yet another example, the client devices 602, 604 may generate a set of alphanumeric characters (e.g., a "Code") by concatenating several strings as follows:

Code=Payload: Checksum;

Payload=Credential_Type: Credential_ID: User_ID: Random (0-9999);

where "Credential_Type" identifies the type of credential, "Credential_ID" is the credential identifier for the credential being represented, "User_ID" is a unique identifier of a particular user 606, 608, "Random(0-9999)" is a function that returns a random number between 0 and 9999, and "Checksum" is a checksum derived from the Payload, the key, and the time; and Checksum=Truncate (MD5 (Payload: Key: Floor(time/300)), Last_8);

where "Truncate( . . . , Last_8)" is a truncation function that returns the last 8 characters of the input string, "MD5( . . . )" is a function that performs an MD5 hash function on the input string, "Key" is a key associated with the user 606, 608, and "Floor(time/300)" is a function that returns the current time in seconds at the client device 602, 604 divided by 300 and rounded down.

Once the set of alphanumeric characters has been generated, the client devices 602, 604 may encode the set of alphanumeric characters to generate an optical-machine readable representation for the credential. As described herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing credential identifiers, keys, times, and any other suitable data. In other implementations, the optical machine-readable representations may encode other identifiers that are linked to or otherwise associated with credential identifiers and/or keys. As an example, credential identifiers, keys, and times for the users 606, 608 may be encoded using QR codes.

The client device 602, 604 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

Alternatively or in addition, once the set of alphanumeric characters has been generated, the client devices 602, 604 may encode the set of alphanumeric characters to generate a sound signal encoding the set of alphanumeric characters. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz. Additionally or alternatively, the sound signal may be in the ultrasonic frequency range, e.g., about 20 kHz or more.

The sound signal may encode data including or representing credential identifiers, keys, times, and any other suitable data. In other implementations, the sound signal may encode other identifiers that are linked to or otherwise associated with credential identifiers and/or keys. As an example, credential identifiers, keys, and times for the users 606, 608 may be encoded using sound signals. The client device may use any suitable technique for encoding the sound signal. For example, the client device may call a function or library routine that encodes data into sound signals such as the Zoosh SDK by Naratte, Inc. The client device 602, 604 can then output the sound signal from a speaker coupled to the client device for reception by the processing system 612.

When the client device 602, 604 displays an optical machine-readable representation, the validation entity 610 can operate the processing system 612 to scan the portion of the client device's display 1812 showing the representation and decode the representation to generate a set of alphanumeric characters that were encoded in the representation. In particular, the processing system 612 outputs a reticle 648 defining a field of view from a camera operatively coupled to the processing system 612. This reticle 648 can be used by the validation entity 610 to scan the optical machine-readable representation from the relevant portion of the client device's display 644.

The processing system 612 may use any suitable mechanism to scan and decode the optical machine-readable representation. For example, the processing system 612 may access a function or library routine that captures and decodes QR codes and/or barcodes using a camera operatively coupled to the processing system 612. Suitable libraries may include, for example, RedLaser or Zxing.

When the client device 602, 604 outputs a sound signal, the validation entity 610 can operate the processing system 612 to receive the sound signal at a speaker of the processing system and decode the optical machine-readable representation to generate a set of alphanumeric characters that were encoded in the sound signal. The processing system 612 may use any suitable mechanism to receive and decode the sound signal. For example, the client device may call a function or library routine that encodes data into sound signals such as the Zoosh SDK by Naratte, Inc.

Alternatively or in addition to scanning an optical machine-readable representation from the client device or receiving a sound signal from the client device 602, 604, the processing system 612 may obtain the set of alphanumeric characters from the client device 602, 604 via any other suitable transmission method. For example, the client device 602, 604 may transmit the set of alphanumeric characters to the processing system 612 using Bluetooth, Near Field Communications (NFC), and/or Wi-Fi.

Once the processing system 612 has obtained a set of alphanumeric characters from the time-varying representation for a credential from the client device 602, 604 (e.g., from an optical machine-readable representation or a sound signal), the processing system can validate the representation in several ways. As described above, the set of alphanumeric characters may include (or encode or be derived from) a key, a credential identifier, and a time among other data. In some implementations, the processing system 612 may obtain the set of alphanumeric characters and transmit the set of characters to the server 630 in a validation request message to the server 630.

The server 630 receives the validation request message from the processing system 612, and then attempts to confirm that the set of alphanumeric characters derived for the time-varying representation of the credential is valid. In particular, the server 630 may decode the set of alphanumeric characters to obtain the credential identifier. The server 630 can then independently obtain the key of the user associated with the credential identifier (e.g., from a database by querying using the credential identifier) and the time from a timing device accessible to the server 630. The server 630 can then generate a set of alphanumeric characters using the credential identifier and the independently obtained key and time using the techniques used by the client device 602, 604 as described above. Finally, the server 630 can compare the generated set of alphanumeric characters with the set of alphanumeric characters included in the validation request. In some implementations, the server 630 may independently calculate the checksum described above and only determine that the checksums match without determining that both the payloads and the checksums match. Alternatively, the server 630 may independently calculate the checksum described above and determine that both the payloads and the checksums match. If the generated set of alphanumeric characters matches the set of alphanumeric characters from the validation request message, then the server 630 can generate a validation response message indicating that the time-varying representation of the credential was validated. When the timing device of the server 630 is synchronized with the timing devices at client devices 602, 604, the set of alphanumeric characters generated at the server 630 should be identical (or nearly identical) to those of the client devices 602, 604 when the credential identifiers and keys are the same. If the generated set of alphanumeric characters does not match the set of alphanumeric characters from the validation request message, the server's response indicates that the user 608 is not validated.

Although the time between the client devices 602, 604 and the server 630 may be synchronized as described below, in some instances, the time at the server 630 may not exactly match the time from the client device 602, 604. Alternatively, in some implementations, the time at the client devices 602, 604 and the server 630 may not be synchronized. Accordingly, in some implementations, if the first set of alphanumeric characters generated at the server 630 does not match the set of alphanumeric characters received in the validation request message, the server 630 may recalculate the set of alphanumeric characters using an offset (e.g., adding or subtracting a set amount of time such as, for example, 5 minutes) from the time obtained at the server. The recalculated set of alphanumeric characters can then be compared with the set of alphanumeric characters from the validation request. Any suitable number of recalculated sets of alphanumeric characters using any suitable offset may be used to account for time differences between the client devices 602, 604 and the server 630.

In some implementations, if the credential representation is validated, the validation response may include an image, a name, and/or other data relating to the validated user. The server 630 may obtain information relating to the user (e.g., an image of the user) from the credential grantor as described above. For example, the processing system 612 may display the user's name and the user's image as shown in FIG. 6. In some implementations, responsive to receiving a validation response from the server 630, the processing system 612 may obtain the user's image from, for example, a memory of the processing system 612, the server 630, a server made accessible by the credential grantor, or another server. The processing system 612 may then output the user's image to a display operatively coupled to the processing system 612.

In some implementations, the processing system 612 may perform some or all of the validation of the time-varying representation for the credential. For example, the processing system 612 may decode the set of alphanumeric characters to obtain the credential identifier. The processing system 612 can then independently obtain a key and time (e.g., from the server 630 or a database), and generate a set of alphanumeric characters. The processing system 612 can then compare the generated set of alphanumeric characters with the set of alphanumeric characters decoded from the time-varying representation presented by the client device 602, 604.

In other implementations, the processing system 612 may capture and store a copy of the time-varying representation for a credential. For example, the processing system 612 may store a copy of an optical machine-readable representation or a sound signal presented by a client device 602, 604. The processing system 612 may then transmit the copy to the server 630, rather than decoding the representation on the processing system 612. In such implementations, the server 630 can decode the reproduction of the time-varying representation to produce a set of alphanumeric characters, and then validate the set of alphanumeric characters as described above.

Upon successful validation, the server 630 sends the processing system 612 a validation response indicating that the time-varying representation for the credential was valid (e.g., the set of alphanumeric characters decoded from the representation matches a set of alphanumeric characters generated at the server 630). The processing system may then provide a user interface (e.g., screenshot 500 as shown in FIG. 5) to the validation entity 610 indicating that the time-varying representation presented by the user 608 was valid. The validation entity 610 may then permit the user 608 to enter the place of business.

While shown in FIG. 6 as a person, the validation entity 610 can be any agent capable of validating representations of credentials presented by users. As an example, the validation entity 610 could be a software application executing on the processing system 612 that processes a time-varying representation for a credential received from a client device 602, 604 (e.g., an optical machine-readable representation for a credential or a sound signal), decodes the representation to generate an alphanumeric set of characters, transmits the alphanumeric set of characters to the server 630, and receives a response from the server 630 indicating that the representation is valid. The software application could then control an automated gate to permit user 608 to enter. The processing system 612 can also be any suitable computer or set of computers capable of communicating with the server 630 via network 620, such as a mobile phone, smart phone, PDA, tablet computer, laptop or desktop computer, or other stationary or portable device, that includes one or more processors and non-transitory computer readable media.

Time-varying representations for multiple credentials may be displayed and/or presented concurrently. This may be implemented, for example, when credentials represent a hierarchy of access. As an example, if Mr. John Smith is an employee of Company X and also is authorized to access the 12th floor of Company X's headquarters, he may have two credentials, i.e., a first credential identifying Mr. Smith as an employee who is authorized to enter the headquarters, and a second authorizing Mr. Smith to access the 12th floor. In such implementations, optical machine-readable representations for the first credential and the second credential may both be presented at the same time so that a validation entity can permit Mr. Smith access to the 12th floor.

Figure 7:
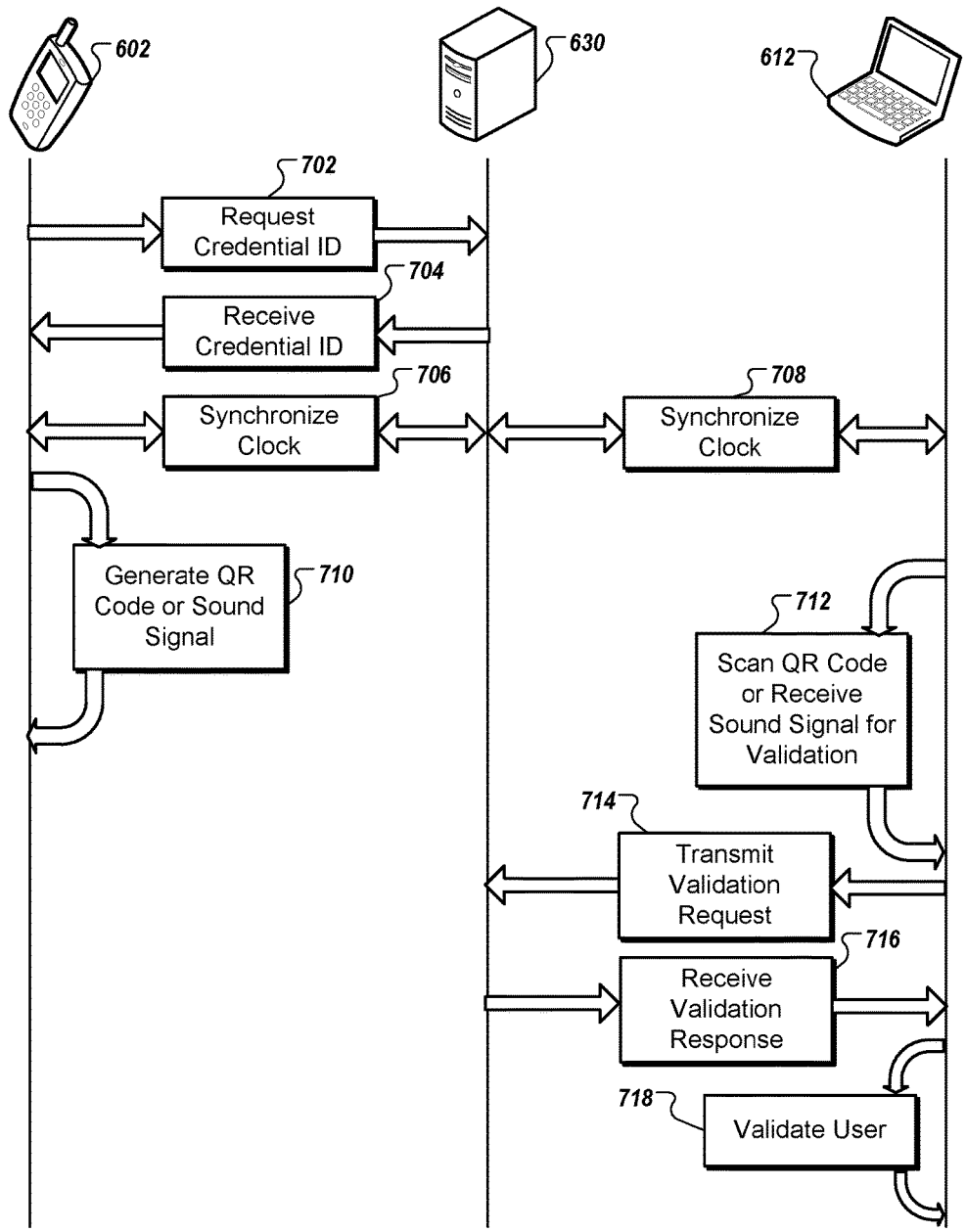
FIG. 7 is a messaging diagram that illustrates sample messages between a client device, server, and processing system in a system that manages time-varying representations for credentials and permits a validation entity to validate the credentials.

FIG. 7 illustrates sample messages between a client device, server, and processing system in a system that manages time-varying representations for credentials. The messages described below may be transmitted via any suitable protocol such as, for example, HTTP or SMS. Additionally, these example messages should not be considered limiting, as any suitable mechanism for performing the functions described could be used, and the messages could be sent or received in any suitable sequence.

In FIG. 7 initially, a client device 602 transmits a request message 702 for a credential identifier to a server 630. This request may be, for example, a request for credential identifiers associated with a user logged into the client device 602. The request also may be, for example, initiated in response to the operator of the client device 602 accepting an offer of (or requesting) a credential from a credential grantor (e.g., accepting or requesting an employee badge). In response, the server 630 transmits a response message 704 to the client device 602 that includes a credential identifier. In some implementations, the server 630 may push the message 704 including the credential identifier to the client device 602 without first receiving a request message 702. The client device 602 may similarly obtain the key, or may already have the key stored in a memory of the client device 602.

Next, the client device 602 and in some implementations the processing system 612 associated with the validation entity 610 synchronize timing devices (e.g., local clocks) with a master clock of the server 630 by transmitting synchronization messages 706 and 708 (e.g. network time protocol (NTP) messages). While synchronization is shown as occurring only once, and simultaneously among the client device 602, server 630, and processing system 612, synchronization may occur at regular time intervals and need not be performed simultaneously for the client device 602 and the processing system 612. Also, while only one server 630 is illustrated, multiple time servers could be used synchronize the timing devices of client device 602 and processing system 612. Synchronization among the client device 602, the server 630, and the processing system 612, can be performed using any suitable technique. For example, NTP, global positioning system (GPS), or IEEE 1588 precision time protocol (PTP) may be used.

When the user of the client device 602 inputs a command to output a time-varying representation for a credential, in step 710, the client device 602 generates an optical machine-readable representation for the credential or a sound signal representing the credential using the credential identifier, key, and time as described above. The client device 602 may then present the time-varying representation for the credential to the validation entity 610 for validation. For example, the processing system 612 may scan an optical machine-readable representation or receive a sound signal in step 712, and decode the representation to obtain the set of alphanumeric characters as described above. The processing system 612 then sends a validation request message 714 to validate the set of alphanumeric characters to the server 630. The server 630 then transmits a validation response message 716 back to the processing system 612 that indicates whether the time-varying representation was valid. If so, then the processing system 612 validates the user in step 718.

Figure 8:
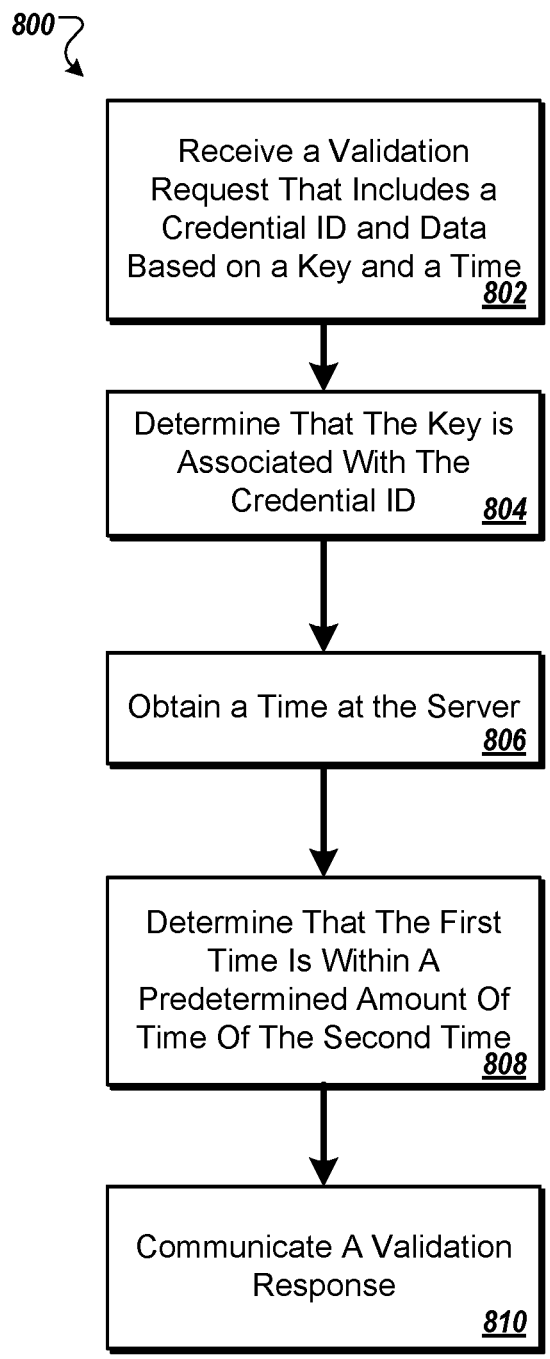
FIG. 8 is a flowchart of an example process for validating a validation request received at a server.

FIG. 8 shows an example process 800 for validating a validation request received at a server 630. In step 802, a server 630 receives a validation request from a processing system 612 associated with a validation entity 610. The validation request may be received, for example, via HTTP, SMS, or any other suitable communication technique. The validation entity 610 may be, for example, a security guard operating the processing system 612 or a software component that manages validation of credentials. The validation request includes a set of alphanumeric characters that were derived from a time-varying representation for a credential. In particular, the set of alphanumeric characters includes data corresponding to a key associated with a user, a credential identifier identifying the credential, and a time at a client device 602, 604. For example, the set of alphanumeric characters may include the credential identifier and a checksum derived from, among other data, the key and the time as described above.

In step 804, the server 630 determines that the key is associated with the credential identifier. For example, the server 630 may query a database using the credential identifier to obtain a key associated with a user to whom the credential corresponds. In step 806, the server obtains a time from a timing device accessible to the server 630. The timing device may be, for example, a hardware or software clock.

Next, in step 808, the server 630 determines that the time from the timing device obtained by the server is within a predetermined amount of time of the time at the client device 602, 604 (e.g., the time used to derive a portion of the set of alphanumeric characters). The server 630 may make this determination, for example, by independently encoding a set of alphanumeric characters using the credential identifier, the key, and the time obtained from the timing device in accordance with the same technique used at the client device 602, 604. If the set of alphanumeric characters encoded by the server 630 matches the set of alphanumeric characters received from the processing system 612, then the server 630 infers that the time at the timing device matched the time at the client device 602, 604. In some instances, determining, at the server, that the first time at the client device does not match the second time from the timing device involves adjusting the second time from the timing device by an offset, then determining that the adjusted second time matches the first time at the client device.

In step 810, responsive to determining that the key is associated with the credential identifier, and that the time from the timing device is within a predetermined amount of time of the time from the set of alphanumeric characters received from the processing system 612, the server 630 communicates a validation response to the processing system 612 indicating that the credential is validated (e.g., that the set of alphanumeric characters received from the processing system corresponds to a combination of a credential identifier, key, and time for an authorized user).

In some implementations, in response to determining that the key is associated with the credential identifier and that the time from the timing device is within the predetermined amount of time of the time at the client device, the server 630 obtains an image of the authorized user. The server 630 then transmits the image of the user to the processing system 612.

While the server 630 is described as being separate from the processing system 612, in some implementations, the server 630 may be co-located with the processing system 612. For example, the server 630 and the processing system 612 could share the same processor or set of processors. Alternatively or in addition, some or all of the functions of the server 630 could be performed by the processing system 612.

In some implementations, the time-varying representation for the credential comprises a time-varying optical machine-readable representation (e.g., a QR code, barcode, or Aztec code) for the credential. In some implementations, the time-varying representation for the credential comprises a time-varying code rendered as a sound signal. The sound signal may have a frequency greater than 20 kHz (e.g., ultrasonic frequencies), or the sound signal may have a frequency between about 20 Hz and 20 kHz (e.g., audible sound).

Figure 9:
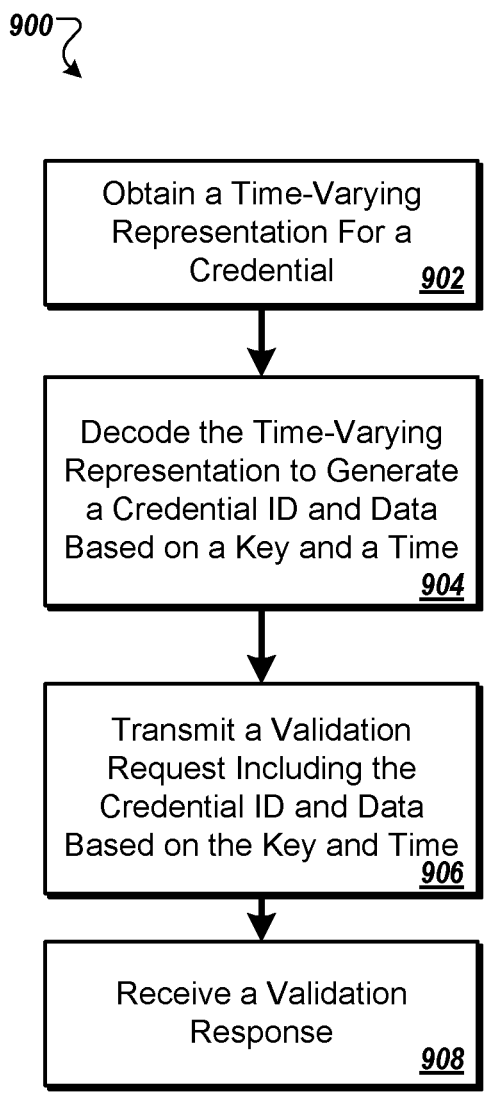
FIG. 9 is a flowchart of an example process for validating a credential at a processing system operated by a validation entity.

FIG. 9 shows an example process 900 for validating a credential at a processing system operated by a validation entity. In step 902, a processing system 612 associated with a validation entity 610 obtains a time-varying representation for a credential from a client device of a user. In some implementations, this may involve scanning a time-varying optical machine-readable representation for a credential (e.g., a QR code, barcode, or Aztec code) from a client device 602, 604 of a user 606, 608. In some implementations, this may involve receiving a sound signal at a microphone coupled to the processing system 612. The sound signal may be outputted from a speaker on a client device 602, 604 of a user 606, 608. The sound signal encodes a set of alphanumeric characters corresponding to the time-varying representation for the credential.

Next, in step 904, the processing system 612 decodes the time-varying representation for the credential to generate a set of alphanumeric characters. The set of alphanumeric characters includes data corresponding to: (i) a key, (ii) a credential identifier, and (iii) a time at the client device 602, 604. For example, the set of alphanumeric characters may include the credential identifier and a checksum derived from, among other data, the key and the time as described above. The key may be an alphanumeric code that can be used for encryption and/or decryption that is associated with the user, and the credential identifier identifies a credential (e.g. an employee badge). In implementations where the time-varying representation is an optical-machine readable representation, the processing system decodes the optical machine-readable representation for the credential to generate a set of alphanumeric character, for example using a routine or library. In implementations where the time-varying representation is a sound signal, the processing system decodes the sound signal to generate a set of alphanumeric characters, for example using a routine or library.

Then, in step 906, the processing system 612 transmits a validation request to a server 630. Among other data, the validation request includes data corresponding to the key, the credential identifier, and the time. For example, the request may include the credential identifier and a checksum derived from, among other data, the key and the time as described above. Finally, upon successful validation by the server 630, the processing system 612 receives a validation response from the server 630, where the validation response indicates that the credential is validated.

In some implementations, in response to receiving a validation response from the server, the processing system 612 obtains an image of the user and outputs the image of the user to a display operatively coupled to the processing system 612. The processing system 612 may obtain the image, for example, from the server 630, from a database accessible by the processing system, from a third-party server, and/or from a server associated with the credential grantor.

Figure 10:
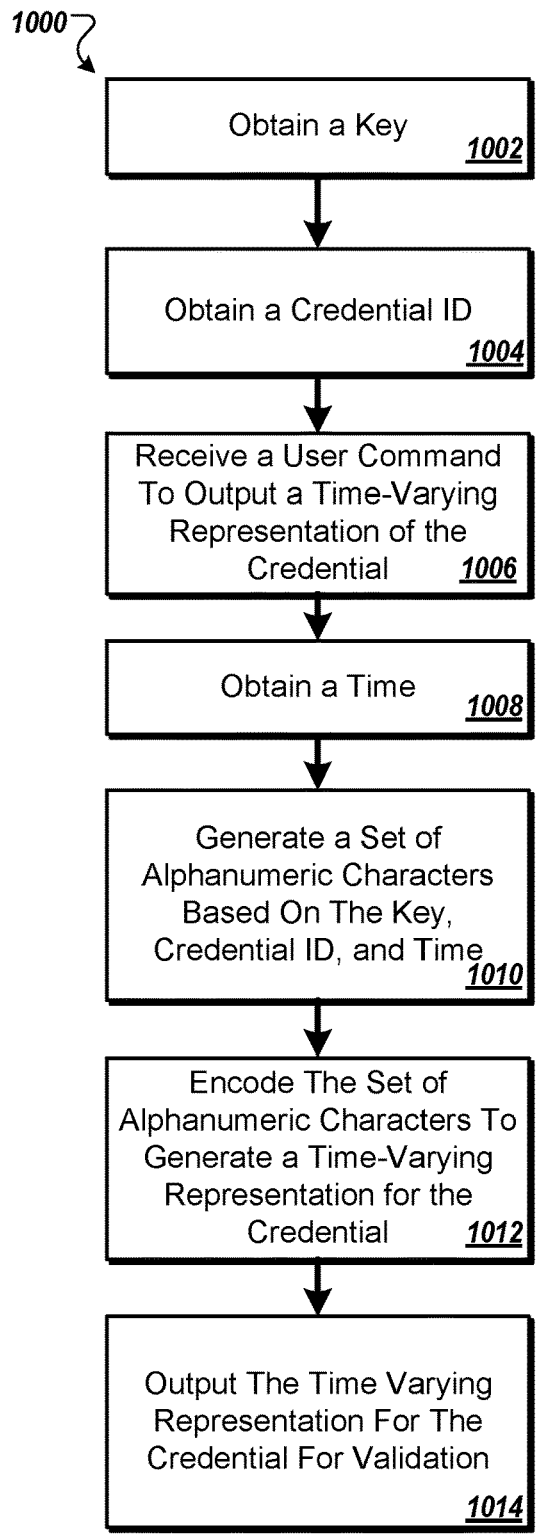
FIG. 10 is a flowchart of an example process for outputting a representation for a credential.

FIG. 10 shows an example process 1000 for outputting a representation for a credential to a validation entity. In step 1002, a client device 602, 604 obtains a key associated with a user of the client device. As discussed above, in some implementations, an application executing on the client device 602, 604 may have the key pre-installed, or may receive a key when a user first runs the application and creates a user account associated with the application, or may receive a key when a user logs into the application from the client device 602, 604. In some implementations, the client device may receive the key from the server in a key exchange (e.g., a Diffie-Hellman key exchange).

In step 1004, the client device 602, 604 obtains a credential identifier associated with a credential. As discussed above, the client device 602, 604 may receive the credential identifier from the server 630 in response to a request from the client device 602, 604 or in a push notification or SMS from the server 630.

Then, in step 1006, the client device 602, 604 receives a user command to output a representation for the credential. The user command may select, for example, an option to cause the client device to output an optical machine-readable representation for the credential (e.g., a QR code, barcode, or Aztec code). Alternatively or in addition, the user command may select, for example, an option to cause the client device to output a sound signal encoding a set of alphanumeric characters. The sound signal, for example, may have frequencies greater than 20 kHz (e.g., such that it may not be audible to the human ear), or frequencies between about 20 Hz and 20 kHz (e.g., such that it may be audible to the human ear).

The client device 602, 604 then generates and outputs a representation of the credential for validation. In particular, in step 1008, the client device 602, 604 obtains a current time derived from a timing device of the client device. The timing device may be, for example, a local hardware or software clock on the client device.

Then, in step 1010, the client device 602, 604 generates a set of alphanumeric characters based on the credential identifier, the key, and the time derived from the timing device. As described above, the client device 602, 604 may generate the set of alphanumeric characters from the credential identifier, key, and time by concatenation, manipulation using mathematical functions, encryption using a cryptographic algorithm such as AES, hashing using a hash function such as MD5, SHA-1 or SHA-2, subsampling to select a predetermined subset or subsets, or any combination of these techniques to generate a suitable set of characters.

Next, in step 1012, the client device 602, 604 encodes the set of alphanumeric characters to generate a representation for the credential. In some implementations, the client device encodes the set of alphanumeric characters to generate an optical-machine readable representation for the credential (e.g., a QR code, a barcode, or an Aztec code). In some implementations, the client device encodes the set of alphanumeric characters into a sound signal representing the set of alphanumeric characters.

Finally, in step 1014, the client device outputs the representation for the credential in a manner that enables a validation entity 610 to validate the credential. In instances where the user command specifies an optical machine-readable representation for the credential, the client device outputs the optical machine-readable representation for the credential to a display of the client device in a manner that enables a validation entity to validate the credential. In instances where the user command specifies a sound signal, the client device outputs the sound signal from a speaker operatively coupled to the client device in a manner that enables a validation entity to validate the credential.

In some implementations, the client device 602, 604 may periodically update the representation for the credential at a predetermined frequency (e.g., every 5 minutes). In such implementations, the client device may generate two or more representations for the credential in response to a user command. For example, the user 606, 608 could enter a command to output a representation for the credential. Then, the client device 602, 604 could obtain a first time derived from a timing device of the client device, generate a first set of alphanumeric characters based on the credential identifier, the key, and the first time derived from the timing device, encode the first set of alphanumeric characters to generate a first representation for the credential, and output the first representation for the credential. After the predetermined time period, the client device 602, 604 could obtain a second time, generate a second set of alphanumeric characters based on the credential identifier, the key, and the second time, encode the second set of alphanumeric characters to generate a second representation for the credential, and output the second representation for the credential.

A wide variety of applications are possible based on the subject matter described above. For example, credentials could be used to permit access to facilities. Representations for a credential could be provided to employees of a company, or other individuals authorized to access company property. In some cases, the validation of the representations could be automated. For example the validation entity could be a software agent that operates the processing system and controls an electro-mechanical lock or gate to permit validated users to enter a physical space. Additionally or alternatively, the validation entity could be a software agent that operates the processing system and controls an alarm system such that the validation entity can disable the alarm system responsive to presentation of a valid credential. Similarly, representations could be distributed to employees or other individuals authorized to permit them access to a company's logical resources (e.g., the company's electronic data or website) and access to such logical resources could be granted responsive to successful validation. Additionally, employees of a utility or other service company (e.g., a cable company representative) could present representations for a credential to identify themselves to customers.

In another specific example in which a credential provides access to a physical space (e.g., by unlocking a physical lock or gate and/or disabling an alarm system), the credential may be represented as a sound signal as described above, and the sound signal may be directed into a microphone in order to gain access to the physical space; or the credential may be represented by an optical machine readable code (e.g., a QR code), and the optical machine readable code may be scanned by an appropriate sensor in order to gain access to the physical space.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as, for example, a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above, though they need not be. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

The invention claimed is:

1. A method comprising:
   receiving, by a server system, a validation request from a processing system associated with a validation entity, the validation request comprising a set of alphanumeric characters, wherein the set of alphanumeric characters were derived from a time-varying representation for a credential, wherein the time-varying representation for the credential comprises at least one from the group consisting of (i) a time-varying optical machine-readable representation for the credential and (ii) a time-varying code rendered as a sound signal, the sound signal having a frequency greater than 20 kHz, the set of alphanumeric characters comprising data corresponding to a key associated with a user, a credential identifier identifying the credential, and a first time by a client device;
   determining, by the server system, that the key is associated with the credential identifier;
   obtaining, by the server system, a second time from a timing device;
   determining, by the server system, that the second time from the timing device is within a predetermined amount of time of the first time by the client device; and
   responsive to determining that the key is associated with the credential identifier, and that the second time is within a predetermined amount of time of the first time, communicating, by the server system and to the processing system, a validation response indicating that the credential is validated.

2. The method of claim 1, wherein receiving the validation request from the processing system associated with the validation entity comprises receiving the validation request via SMS from the processing system associated with the validation entity.

3. The method of claim 1, further comprising:
   responsive to determining, by the server system, that the key is associated with the credential identifier and that the second time from the timing device is within the predetermined amount of time of the first time by the client device:
   obtaining, by the server system, an image of the user; and
   transmitting, from the server to the processing system, the image of the user.

4. The method of claim 1, wherein determining, by the server system, that the key is associated with the credential identifier comprises:
   querying a database using the credential identifier to obtain a record corresponding to the credential identifier; and
   determining that the record includes the key.

5. The method of claim 1, wherein the server is co-located with the processing system associated with the validation entity.

6. The method of claim 1, wherein the time-varying representation for the credential comprises a time-varying optical machine-readable representation for the credential.

7. The method of claim 1, wherein the time-varying representation for the credential comprises a time-varying code rendered as a sound signal, the sound signal having a frequency greater than 20 kHz.

8. The method of claim 1, wherein determining, by the server system, that the second time from the timing device is within a predetermined amount of time of the first time by the client device comprises:
   determining, by the server system, that the first time by the client device does not match the second time from the timing device;
   adjusting, by the server system, the second time from the timing device by an offset; and
   determining, by the server system, that the adjusted second time matches the first time by the client device.

9. The method of claim 1, wherein the credential identifier identifies one of multiple credentials accessible using the client device.

10. The method of claim 1, wherein the credential identifier identifies a credential granted to a group of users that includes the user.

11. The method of claim 1, wherein the credential identifier identifies a credential accessible using any of multiple client devices.

12. A system comprising:
   a server system comprising one or more computers; and
   one or more computer-readable media storing instructions that, when executed by the one or more computers of the server system, cause the server system to perform operations comprising:
      receiving, by the server system, a validation request from a processing system associated with a validation entity, the validation request comprising a set of alphanumeric characters, wherein the set of alphanumeric characters were derived from a time-varying representation for a credential, wherein the time-varying representation for the credential comprises at least one from the group consisting of (i) a time-varying optical machine-readable representation for the credential and (ii) a time-varying code rendered as a sound signal, the sound signal having a frequency greater than 20 kHz, the set of alphanumeric characters comprising data corresponding to a key associated with a user, a credential identifier identifying the credential, and a first time by a client device;

determining, by the server system, that the key is associated with the credential identifier;

obtaining, by the server system, a second time from a timing device;

determining, by the server system, that the second time from the timing device is within a predetermined amount of time of the first time by the client device; and responsive to determining that the key is associated with the credential identifier, and that the second time is within a predetermined amount of time of the first time, communicating, by the server system and to the processing system, a validation response indicating that the credential is validated.

13. A method comprising:

obtaining, by a processing system associated with a validation entity, a time-varying representation for a credential from a client device of a user, wherein obtaining the time-varying representation comprises at least one from the group consisting of (i) scanning, by the processing system, a time-varying optical machine-readable representation for the credential from the client device and (ii) receiving, at a microphone operatively coupled to the processing system, a sound signal from the client device, the sound signal encoding the time-varying representation for the credential;

decoding, by the processing system, the time-varying representation for the credential to generate a set of alphanumeric characters, wherein the decoding includes decoding at least one from the group consisting of (i) the scanned time-varying optical machine-readable representation to generate the set of alphanumeric characters and (ii) the received sound signal to generate the set of alphanumeric characters, wherein the set of alphanumeric characters comprises data corresponding to: (i) a key, (ii) a credential identifier, and (iii) a time by the client device, wherein the key is associated with the user, and wherein the credential identifier identifies the credential;

transmitting, from the processing system, a validation request to a server, wherein the validation request includes data corresponding to the key, the credential identifier, and the time; and receiving a validation response from the server, the validation response indicating that the credential is validated.

14. The method of claim 13, wherein:

obtaining, by a processing system associated with a validation entity, a time-varying representation for a credential from a client device of a user comprises scanning, by a processing system associated with a validation entity, a time-varying optical machine-readable representation for a credential from a client device of a user; and decoding, by the processing system, the time-varying representation for the credential to generate a set of alphanumeric characters comprises decoding, by the processing system, the scanned time-varying optical machine-readable representation for the credential to generate the set of alphanumeric characters.

15. The method of claim 13, wherein:

obtaining, by a processing system associated with a validation entity, a time-varying representation for a credential from a client device of a user comprises receiving, at a microphone operatively coupled to the processing system associated with a validation entity, a sound signal encoding the set of alphanumeric characters corresponding to the time-varying representation for the credential from a client device of a user; and decoding, by the processing system, the time-varying representation for the credential to generate a set of alphanumeric characters comprises decoding, by the processing system, the received sound signal to generate a set of alphanumeric characters.

16. The method of claim 13, further comprising:

in response to receiving a validation response from the server:

obtaining, by the processing system, an image of the user; and outputting, to a display operatively coupled to the processing system, the image of the user.

17. A system comprising:

a processing system associated with a validation entity, the processing system comprising one or more computers; and one or more computer-readable media storing instructions that, when executed by the one or more computers of the processing system, cause the processing system to perform operations comprising:

obtaining, by the processing system, a time-varying representation for a credential from a client device of a user, wherein obtaining the time-varying representation comprises at least one from the group consisting of (i) scanning, by the processing system, a time-varying optical machine-readable representation for the credential from the client device and (ii) receiving, at a microphone operatively coupled to the processing system, a sound signal from the client device, the sound signal encoding the time-varying representation for the credential;

decoding, by the processing system, the time-varying representation for the credential to generate a set of alphanumeric characters, wherein the decoding includes decoding at least one from the group consisting of (i) the scanned time-varying optical machine-readable representation to generate the set of alphanumeric characters and (ii) the received sound signal to generate the set of alphanumeric characters, wherein the set of alphanumeric characters comprises data corresponding to: (i) a key, (ii) a credential identifier, and (iii) a time by the client device, wherein the key is associated with the user, and wherein the credential identifier identifies the credential;

transmitting, from the processing system, a validation request to a server, wherein the validation request includes data corresponding to the key, the credential identifier, and the time; and receiving a validation response from the server, the validation response indicating that the credential is validated.

18. A method comprising:

obtaining, by an electronic device, a key associated with a user of the electronic device;

obtaining, by the electronic device, a credential identifier associated with a credential;

receiving, by the electronic device, a user command to output a representation for the credential, wherein the user command comprises at least one from the group consisting of (i) a user command to display an opticalmachine-readable representation for the credential and (ii) a user command to provide a sound signal representing the credential; and in response to receiving, by the electronic device, the user command to output the representation for the credential:

obtaining, by the electronic device, a time;

generating, by the electronic device, a set of alphanumeric characters based on the credential identifier, the key, and the time;

encoding, by the electronic device, the set of alphanumeric characters to generate a representation for the credential that includes at least one from the group consisting of (i) an optical machine-readable representation representing the set of alphanumeric characters and (ii) a sound signal representing the set of alphanumeric characters; and outputting, by the electronic device, the representation for the credential in a manner that enables a validation entity to validate the credential, wherein outputting the representation comprises at least one from the group consisting of (i) outputting, to a display of the electronic device, the optical machine-readable representation for the credential and (ii) rendering, at a speaker operatively coupled to the electronic device, the sound signal representing the credential.

19. The method of claim 18, wherein:

encoding, by the electronic device, the set of alphanumeric characters to generate a representation for the credential comprises encoding, by the electronic device, the set of alphanumeric characters to generate an optical-machine readable representation for the credential;

receiving, by the electronic device, a user command to output the representation for the credential comprises receiving, by the electronic device, a user command to display the optical-machine-readable representation for the credential; and outputting, by the electronic device, the representation for the credential in a manner that enables a validation entity to validate the credential comprises outputting, to a display of the electronic device, the optical machine-readable representation for the credential in a manner that enables a validation entity to validate the credential.

20. The method of claim 18, wherein:

encoding, by the electronic device, the set of alphanumeric characters to generate a representation for the credential comprises encoding, by the electronic device, the set of alphanumeric characters into a sound signal representing the set of alphanumeric characters;

receiving, by the electronic device, a user command to output the representation for the credential comprises receiving, by the electronic device, a user command to render the sound signal representing the credential from a speaker operatively coupled to the electronic device; and outputting, by the electronic device, the representation for the credential in a manner that enables a validation entity to validate the credential comprises rendering, at a speaker operatively coupled to the electronic device, the sound signal representing the credential.

21. An electronic device comprising:

one or more processors; and one or more machine-readable storage media storing instructions that, when executed by the one or more processors, cause the electronic device to perform operations comprising:

obtaining, by the electronic device, a key associated with a user of the electronic device;

obtaining, by the electronic device, a credential identifier associated with a credential;

receiving, by the electronic device, a user command to output a representation for the credential, wherein the user command comprises at least one from the group consisting of (i) a user command to display an optical-machine-readable representation for the credential and (ii) a user command to provide a sound signal representing the credential; and in response to receiving, by the electronic device, the user command to output the representation for the credential:

obtaining, by the electronic device, a time;

generating, by the electronic device, a set of alphanumeric characters based on the credential identifier, the key, and the time;

encoding, by the electronic device, the set of alphanumeric characters to generate a representation for the credential that includes at least one from the group consisting of (i) an optical machine-readable representation representing the set of alphanumeric characters and (ii) a sound signal representing the set of alphanumeric characters; and outputting, by the electronic device, the representation for the credential in a manner that enables a validation entity to validate the credential, wherein outputting the representation comprises at least one from the group consisting of (i) outputting, to a display of the electronic device, the optical machine-readable representation for the credential and (ii) rendering, at a speaker operatively coupled to the electronic device, the sound signal representing the credential.

* * * * *